United States Patent
Srivastava et al.

(10) Patent No.: US 9,483,207 B1
(45) Date of Patent: Nov. 1, 2016

(54) METHODS AND SYSTEMS FOR EFFICIENT CACHING USING AN INTELLIGENT STORAGE ADAPTER

(71) Applicant: QLOGIC, Corporation, Aliso Viejo, CA (US)

(72) Inventors: Gaurav Srivastava, Pune (IN); Sameer K. Kshatriya, Pune (IN); Shashikiran Revankar, Pune (IN)

(73) Assignee: QLOGIC, Corporation, Aliso Viejo, CA (US)

( * ) Notice: Subject to any disclaimer, the term of this patent is extended or adjusted under 35 U.S.C. 154(b) by 0 days.

(21) Appl. No.: 14/593,898

(22) Filed: Jan. 9, 2015

(51) Int. Cl.
    G06F 3/06     (2006.01)
(52) U.S. Cl.
    CPC .............. *G06F 3/0656* (2013.01); *G06F 3/067* (2013.01); *G06F 3/0608* (2013.01)
(58) Field of Classification Search
    None
    See application file for complete search history.

(56) References Cited

U.S. PATENT DOCUMENTS

| | | | |
|---|---|---|---|
| 5,689,678 A | 11/1997 | Stallmo et al. | |
| 6,219,676 B1 | 4/2001 | Reiner | |
| 6,467,022 B1 | 10/2002 | Buckland et al. | |
| 6,484,229 B1 | 11/2002 | Ichikawa et al. | |
| 6,502,205 B1 | 12/2002 | Yanai et al. | |
| 6,745,324 B1 | 6/2004 | Skazinski et al. | |
| 6,799,283 B1 | 9/2004 | Tamai et al. | |
| 6,922,754 B2 | 7/2005 | Liu et al. | |
| 7,013,336 B1 | 3/2006 | King | |
| 7,249,221 B2 | 7/2007 | Shimada | |
| 7,272,674 B1 | 9/2007 | Nandi et al. | |
| 7,356,573 B2 | 4/2008 | Sharma et al. | |
| 7,506,124 B2 | 3/2009 | Sharma et al. | |
| 7,617,289 B2 | 11/2009 | Srinivasan et al. | |
| 7,631,155 B1 | 12/2009 | Bono et al. | |
| 7,685,269 B1 | 3/2010 | Thrasher et al. | |
| 7,865,663 B1 | 1/2011 | Nelson et al. | |
| 7,873,619 B1 | 1/2011 | Faibish et al. | |
| 8,099,499 B2 | 1/2012 | Oeda | |
| 8,510,265 B1 | 8/2013 | Boone et al. | |
| 8,555,022 B1 | 10/2013 | Edwards et al. | |
| 8,589,550 B1 | 11/2013 | Faibish et al. | |
| 8,626,967 B1 | 1/2014 | Naik et al. | |
| 8,639,872 B1 | 1/2014 | Boyle et al. | |
| 8,805,951 B1 | 8/2014 | Faibish et al. | |

(Continued)

OTHER PUBLICATIONS

"International Search Report on corresponding PCT application (PCT/US2013/042918) from International Searching Authority (USPTO) dated Nov. 27, 2013".

(Continued)

*Primary Examiner* — Idriss N Alrobaye
*Assistant Examiner* — Dayton Lewis-Taylor
(74) *Attorney, Agent, or Firm* — Klein, O'Neill & Singh, LLP

(57) ABSTRACT

Systems and methods for caching information are provided. A method includes receiving an input/output (I/O) request for writing data at a storage device, the I/O request including a logical unit number (LUN) identifier, a logical block address (LBA) associated with storage space at the storage device and a data payload; determining a hash value using the data payload; using the hash value to determine if the data payload already has been cached by an adapter; updating a reference count at a hash data structure indicating that the cached data payload is referenced by more than one I/O request, when the data payload has been cached by the adapter; and updating the hash data structure, when the data payload does not exist at a cache managed by the adapter.

18 Claims, 7 Drawing Sheets

(56) References Cited

U.S. PATENT DOCUMENTS

| | | | |
|---|---|---|---|
| 8,863,145 | B2 | 10/2014 | Watanabe et al. |
| 9,009,444 | B1 | 4/2015 | Derbeko et al. |
| 9,172,586 | B1 | 10/2015 | Shah et al. |
| 9,232,005 | B1 | 1/2016 | Shah et al. |
| 2003/0135782 | A1 | 7/2003 | Matsunami et al. |
| 2003/0140209 | A1 | 7/2003 | Testardi |
| 2003/0172149 | A1 | 9/2003 | Edsall et al. |
| 2005/0027798 | A1 | 2/2005 | Chiou et al. |
| 2005/0210314 | A1 | 9/2005 | Iguchi |
| 2006/0031653 | A1 | 2/2006 | Todd et al. |
| 2006/0075190 | A1 | 4/2006 | Higaki et al. |
| 2006/0095709 | A1 | 5/2006 | Achiwa |
| 2006/0218362 | A1 | 9/2006 | McManis |
| 2006/0282618 | A1* | 12/2006 | Thompson .......... G06F 12/0804 711/118 |
| 2007/0016681 | A1 | 1/2007 | Suzuki et al. |
| 2007/0028073 | A1 | 2/2007 | Takayama et al. |
| 2008/0071984 | A1 | 3/2008 | Araki et al. |
| 2008/0104259 | A1 | 5/2008 | LeFevre et al. |
| 2008/0114961 | A1 | 5/2008 | Ramaswamy et al. |
| 2008/0270700 | A1 | 10/2008 | Rao et al. |
| 2008/0270727 | A1 | 10/2008 | Jacobson et al. |
| 2009/0055507 | A1 | 2/2009 | Oeda |
| 2009/0064161 | A1 | 3/2009 | Hosouchi et al. |
| 2009/0187713 | A1 | 7/2009 | Zedlewski et al. |
| 2009/0210620 | A1 | 8/2009 | Jibbe et al. |
| 2009/0248975 | A1 | 10/2009 | Daud et al. |
| 2009/0265507 | A1 | 10/2009 | Jibbe et al. |
| 2010/0281230 | A1 | 11/2010 | Rabii et al. |
| 2011/0087833 | A1 | 4/2011 | Jones |
| 2011/0138136 | A1 | 6/2011 | Shitomi et al. |
| 2011/0161557 | A1 | 6/2011 | Haines et al. |
| 2011/0191534 | A1 | 8/2011 | Ash et al. |
| 2011/0197046 | A1 | 8/2011 | Chiu et al. |
| 2011/0238672 | A1 | 9/2011 | Agarwala et al. |
| 2011/0276746 | A1 | 11/2011 | Pruthi et al. |
| 2011/0289279 | A1* | 11/2011 | Sonnier ............... G06F 12/0804 711/144 |
| 2012/0005668 | A1 | 1/2012 | Serizawa et al. |
| 2012/0089786 | A1 | 4/2012 | Pruthi |
| 2012/0102137 | A1 | 4/2012 | Pruthi et al. |
| 2012/0137059 | A1 | 5/2012 | Yang et al. |
| 2012/0159053 | A1 | 6/2012 | Kano et al. |
| 2012/0221729 | A1 | 8/2012 | Hara et al. |
| 2012/0254504 | A1 | 10/2012 | Syu et al. |
| 2012/0254509 | A1 | 10/2012 | Cleveland et al. |
| 2012/0331222 | A1 | 12/2012 | Jibbe et al. |
| 2013/0042048 | A1 | 2/2013 | Kutergin et al. |
| 2013/0080715 | A1 | 3/2013 | Mori et al. |
| 2013/0111474 | A1 | 5/2013 | Agarwal et al. |
| 2013/0132673 | A1 | 5/2013 | Saito et al. |
| 2013/0198457 | A1 | 8/2013 | Kobayashi et al. |
| 2013/0198459 | A1 | 8/2013 | Joshi |
| 2013/0238851 | A1 | 9/2013 | Chang et al. |
| 2013/0282982 | A1 | 10/2013 | Hayashi |
| 2013/0290571 | A1 | 10/2013 | Rizzo et al. |
| 2013/0332612 | A1 | 12/2013 | Cai et al. |
| 2013/0339600 | A1* | 12/2013 | Shah .................. G06F 3/067 711/114 |
| 2014/0013027 | A1 | 1/2014 | Jannyavula Venkata et al. |
| 2014/0122778 | A1 | 5/2014 | O'Brien |
| 2014/0129521 | A1 | 5/2014 | Marsden |
| 2014/0244935 | A1 | 8/2014 | Ezra et al. |
| 2014/0258533 | A1 | 9/2014 | Antony |
| 2015/0058547 | A1 | 2/2015 | Thatcher et al. |
| 2015/0134920 | A1 | 5/2015 | Anderson et al. |
| 2015/0143023 | A1 | 5/2015 | Rostoker et al. |

OTHER PUBLICATIONS

"Written Opinion on corresponding PCT application (PCT/US2013/042918) from International Searching Authority (USPTO) dated Nov. 27, 2013".

"Office Action from USPTO dated Dec. 24, 2014 for U.S. Appl. No. 13/790,395".

"International Preliminary Report on Patentability on corresponding PCT application (PCT/US2013/042918) from International Bureau (WIPO) dated Dec. 16, 2014".

"Office Action from USPTO dated Feb. 20, 2015 for U.S. Appl. No. 13/790,894".

"Office Action from USPTO dated Feb. 24, 2015 for U.S. Appl. No. 13/902,427".

"Office Action from USPTO dated Mar. 3, 2015 for U.S. Appl. No. 13/790,800".

"Office Action from USPTO dated Mar. 11, 2015 for U.S. Appl. No. 13/790,846".

"Office Action from USPTO dated Mar. 27, 2015 for U.S. Appl. No. 13/790,471".

"Office Action from USPTO dated May 7, 2015 for U.S. Appl. No. 13/790,499".

"QLogic 10000 Series QLogic FabricCache Adapter Data Sheet", (Nov. 2013).

"Notice of Allowance from USPTO dated Aug. 14, 2015 for U.S. Appl. No. 13/790,846".

"Final Office Action from USPTO dated Aug. 18, 2015 for U.S. Appl. No. 13/790,395".

"VMWare Storage Best Practices", VMWare, (Apr. 2011),https://www.vmware.com/files/pdf/support/landing_pages/Virtual-Support-Day-Storage-Best-Practices-June-2012.pdf.

"Notice of Allowance from USPTO dated Aug. 26, 2015 for U.S. Appl. No. 13/902,427".

"Notice of Allowance from USPTO dated Sep. 23, 2015 for U.S. Appl. No. 14/088,082".

"Final Office Action from USPTO dated Sep. 24, 2015 for U.S. Appl. No. 13/790,800".

"Final Office Action from USPTO dated Oct. 8, 2015 for U.S. Appl. No. 13/790,471".

"Final Office Action from USPTO dated Sep. 15, 2015 for U.S. Appl. No. 13/790,894".

"Office Action from USPTO dated Oct. 19, 2015 for U.S. Appl. No. 14/165,100".

"Final Office Action from USPTO dated Oct. 23, 2015 for U.S. Appl. No. 13/790,499".

"Office Action from USPTO dated Dec. 4, 2015 for U.S. Appl. No. 14/193,691".

"Notice of Allowance from USPTO dated Nov. 25, 2015 for U.S. Appl. No. 13/790,846".

"Office Action from USPTO dated Dec. 21, 2015 for U.S. Appl. No. 14/302,706".

"Notice of Allowance from USPTO dated Jan. 15, 2016 for U.S. Appl. No. 13/790,395".

"Extended European Search Report from EPO dated Jan. 28, 2016 for EP Application No. 13803862.5".

"Notice of Allowance from USPTO dated Jan. 29, 2016 for U.S. Appl. No. 14/470,309".

"Office Action from USPTO dated Feb. 26, 2016 for U.S. Appl. No. 13/790,499".

"Notice of Allowance from USPTO dated Mar. 1, 2016 for U.S. Appl. No. 13/790,471".

"Notice of Allowance from USPTO dated Mar. 1, 2016 for U.S. Appl. No. 14/470,337".

"Office Action from USPTO dated Mar. 9, 2016 for U.S. Appl. No. 14/312,130".

"Notice of Allowance from USPTO dated Mar. 30, 2016 for U.S. Appl. No. 13/790,471".

"Notice of Allowance from USPTO dated Apr. 11, 2016 for U.S. Appl. No. 13/790,395".

"Final Office Action from USPTO dated Apr. 21, 2016 for U.S. Appl. No. 14/165,100".

"Notice of Allowance from USPTO dated Apr. 26, 2016 for U.S. Appl. No. 14/498,580".

"Office Action from USPTO dated May 6, 2016 for U.S. Appl. No. 14/339,086".

"Notice of Allowance from USPTO dated May 27, 2016 for U.S. Appl. No. 14/302,706".

(56) References Cited

OTHER PUBLICATIONS

"Office Action from USPTO dated Jun. 6, 2016 for U.S. Appl. No. 13/790,894".
"Office Action from USPTO dated Jun. 6, 2016 for U.S. Appl. No. 13/790,800".
"Final Office Action from USPTO dated Jun. 13, 2016 for U.S. Appl. No. 14/193,691".
"Notice of Allowance from USPTO dated Jul. 5, 2016 for U.S. Appl. No. 14/302,706".
Notice of Allowance from USPTO dated Jul. 21, 2016 for U.S. Appl. No. 14/312,130.
Notice of Allowance from USPTO dated Jul. 28, 2016 for U.S. Appl. No. 14/165,100.
Notice of Allowance from USPTO dated Aug. 15, 2016 for U.S. Appl. No. 14/498,580.
Notice of Allowance from USPTO dated Sep. 2, 2016 for U.S. Appl. No. 14/339,086.

\* cited by examiner

METHODS AND SYSTEMS FOR EFFICIENT CACHING USING AN INTELLIGENT STORAGE ADAPTER

TECHNICAL FIELD

The present disclosure relates to storage systems and, more particularly to caching operations using an intelligent storage adapter.

BACKGROUND

A computer network, often simply referred to as a network, is a group of interconnected computers and devices that facilitates communication among users and allows users to share resources. Adapters, switches, and other devices are typically used during network communication for reading and writing data at mass storage devices.

Computing devices (or systems) use mass storage devices to store data. Data centers are commonly used to store large amounts of data for computing devices. Different storage options are available for computing devices to store data and retrieve data, for example, direct-attached storage (DAS), network attached storage (NAS), and storage area networks (SANs).

A DAS system typically includes a plurality of storage drives that are directly attached to a computing device (for example, a server) and are accessible via a host bus adapter (HBA). Common protocols used for DAS storage devices are SCSI (Small Computer Systems Interface), ATA (AT attachment), SATA (Serial ATA), SAS (Serial Attached SCSI), and others. NAS is file-level storage that provides access to a plurality of computing devices. NAS typically uses network file sharing protocols, for example, NFS (Networked File System), CIFS (Common Internet File System), and others for storing and managing data at storage devices.

A SAN is a dedicated network that provides access to consolidated, block level data storage. SANs are primarily used to make storage devices, such as disk arrays, tape libraries, and others, accessible to servers so that the devices appear like locally attached devices to an operating system of a computing device. A SAN typically has its own network of storage devices that are generally not accessible through the local area network by other devices. SANs often use a Fibre Channel fabric topology, an infrastructure specially designed to handle storage communications.

SANs may also use iSCSI (i.e. mapping SCSI over TCP/IP (Transmission Control Protocol/Internet Protocol), Fibre Channel over Ethernet (FCoE), FCP (Fibre Channel over SCSI), Hyper SCSI (i.e. SCSI over Ethernet), and other protocols for storing data at storage devices.

Continuous efforts are being made to provide data reliability and resource efficiency by providing intelligent storage adapters that can cache data directed to a SAN for efficient processing and access.

BRIEF DESCRIPTION OF THE DRAWINGS

The present aspects relating to the caching by a storage adapter will be discussed in detail with an emphasis on highlighting the advantageous features. These novel and non-obvious aspects are depicted in the accompanying drawings, which are for illustrative purposes only. These drawings include the following figures, in which like numerals indicate like parts.

DETAILED DESCRIPTION

Figure 1A:
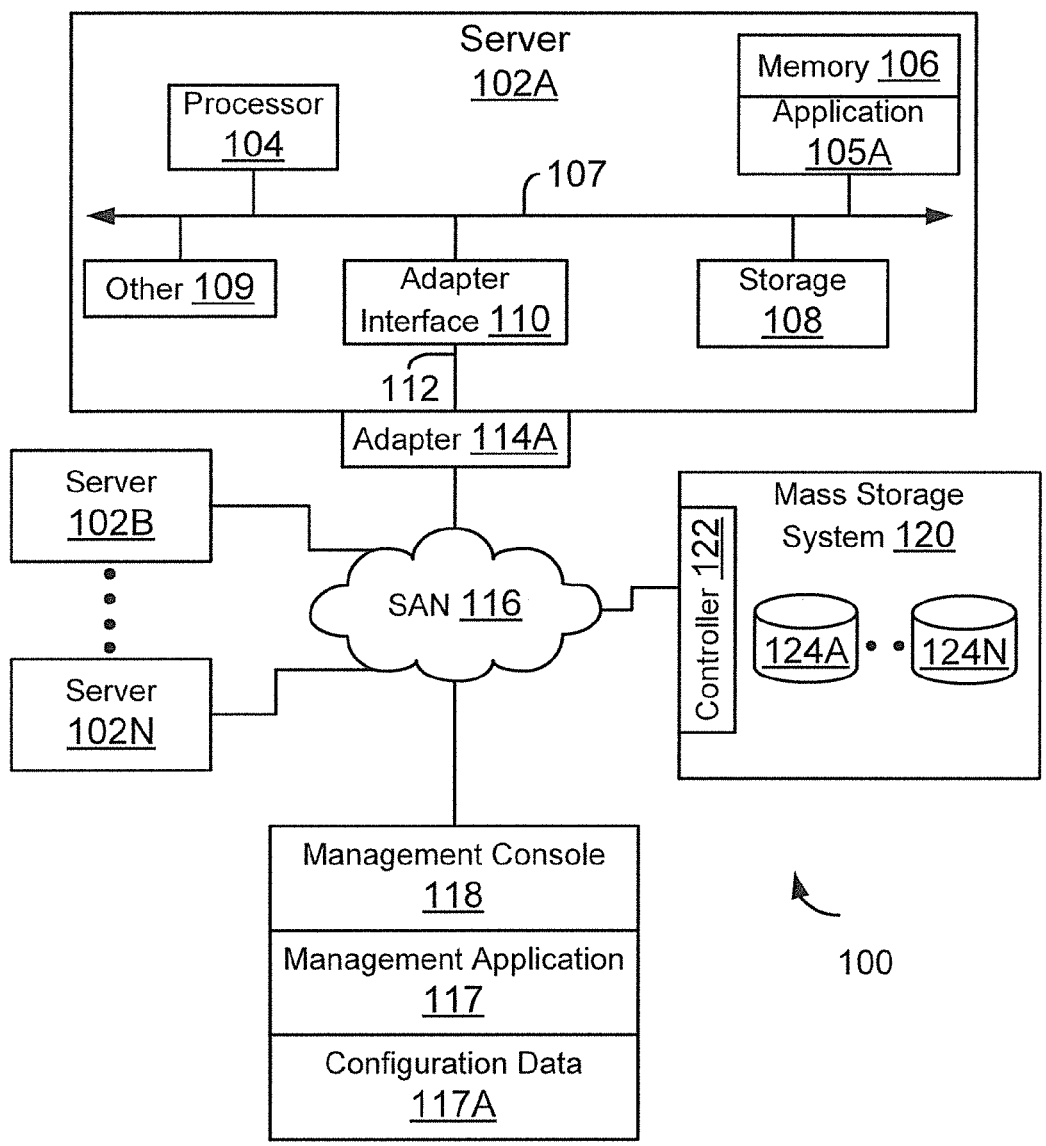
FIG. 1A is a functional block diagram of a system, according to one aspect.

The following detailed description describes the present aspects with reference to the drawings. In the drawings, reference numbers label elements of the present aspects. These reference numbers are reproduced below in connection with the discussion of the corresponding drawing features.

As a preliminary note, any of the aspects described with reference to the figures may be implemented using software, firmware, hardware (e.g., fixed logic circuitry), manual processing, or a combination of these implementations. The terms "logic," "module," "component," "system," and "functionality," as used herein, generally represent software, firmware, hardware, or a combination of these elements. For instance, in the case of a software implementation, the terms "logic," "module," "component," "layer," "system," and "functionality" represent executable instructions that perform specified tasks when executed on a hardware-based processing device or devices (e.g., CPU or CPUs). The program code can be stored in one or more non-transitory, computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations. The term "machine-readable media" and the like refers to any kind of medium for retaining information in any form, including various kinds of storage devices (magnetic, optical, static, etc.).

The aspects disclosed herein may be implemented as a computer process (method), a computing system, or as an article of manufacture, such as a computer program product or computer-readable media. The computer program product may be non-transitory, computer storage media, readable by a computer device, and encoding a computer program of instructions for executing a computer process. The computer program product may also be readable by a computing system, and encoding a computer program of instructions for executing a computer process.

In one aspect, an intelligent storage adapter (ISA), for example, a network device is provided. The ISA includes a storage protocol controller having a port for interfacing with a storage area network (SAN)-based storage device and another adapter operating within a cluster. The ISA also includes a processor executing instructions for managing a local storage device that is configured to operate as a caching device for a computing device. The ISA operates as a host bus adapter and a storage controller for managing storage space at the local storage device and the SAN-based storage device.

System 100: FIG. 1A is a block diagram of a system 100 configured for use with the present aspects. System 100 may include a plurality of computing systems 102A-102N (may also be referred to as server(s) 102 or host system(s) 102), each coupled to an ISA 114A that interfaces with other devices and ISAs, as described below in more detail.

The computing system 102A may include one or more processors 104, also known as central processing units (CPUs). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

Processor 104 executes machine-implemented instructions (or process steps/blocks) out of a memory 106 and interfaces with an interconnect 107 that may be referred to as a computer bus 107. The computer bus 107 may be, for example, a system bus, a Peripheral Component Interconnect (PCI) bus, a PCI-Express (PCIe) bus, a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other type of bus.

The host system 102A may further include a storage device 108, which may include, for example, a hard disk (HDD), a CD-ROM, a non-volatile memory device (flash or memory stick), a hybrid drive (sometimes referred to as SSHD), or any other storage device for storing structured or unstructured data. Storage 108 may store operating system program files (or data containers), application program files, for example, e-mail applications, database applications, management applications, and other application files. Some of these files are stored in storage 108 using an installation program. For example, the processor 104 may execute computer-executable process steps of an installation program so that the processor 104 can properly execute the application program.

In one aspect, storage device 108 may be a solid state storage device (which may also be referred to herein as SSD 108). SSDs are becoming popular for servers that may need to store large amounts of data while being relatively quickly accessible. ISA 114A, which is described below in more detail, may be used to manage and/or access the storage device 108, according to one aspect.

Memory 106 also interfaces with the computer bus 107 to provide the processor 104 with access to memory storage. Memory 106 may include random access main memory (RAM). When executing stored computer-executable process steps from storage 108, the processor 104 may store and execute the process steps out of memory 106. Read only memory (ROM, not shown) may also be used to store invariant instruction sequences, such as startup instruction sequences or basic input/output system (BIOS) sequences for operation of a keyboard (not shown).

In one aspect, processor 104 may execute an application 105A for performing certain functions. For example, application 105A may be a database application, a virtual machine executed in a virtual environment (provided by VMware Corporation, Microsoft Corporation or any other entity), electronic e-mail application (for example, Microsoft® Exchange), or any other application type. Application 105A may issue read and write requests that are processed by ISA 114A, as described below in more detail. Application 105A may also be referred to as a "client."

The host system 102A also includes other devices and interfaces 109, which may include a display device interface, a keyboard interface, a pointing device interface, and others. The details of these components are not germane to the inventive aspects.

ISA 114A may be configured to handle both network and storage traffic while interfacing with other elements. In one aspect, as described below in detail, ISA 114A may be configured to provide the functionality of a host bus adapter (HBA) by providing connectivity to SAN (storage area network)-based storage arrays as well as present logical storage from a local storage device connected to the ISA. Various network and storage protocols may be used to handle network and storage traffic, for example, Ethernet, Fibre Channel, Fibre Channel over Ethernet (FCoE), Internet over Small Computer System Interface (iSCSI), and others. Some of the common protocols are described below.

Ethernet is a common network protocol used for network communication. The original Ethernet bus or star topology was developed for local area networks (LAN) to transfer data at 10 Mbps (megabits per second). Newer Ethernet standards (for example, Fast Ethernet (100 Base-T) and Gigabit Ethernet) support data transfer rates that are greater than 1 gigabit (Gb). The various aspects described herein may use Ethernet (which includes 100 Base-T and/or Gigabit Ethernet) as the network protocol. However, the adaptive aspects disclosed herein are not limited to any particular protocol, as long as the functional goals are met by an existing or new network protocol.

Fibre Channel (may also be referred to as "FC") is a common storage protocol used in SANs. Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected. Fibre Channel fabric devices include a node port or "N_Port" that manages Fabric connections. The N_port establishes a connection to a Fabric element (e.g., a switch) having a fabric port or F_port.

A new and upcoming standard, called Fibre Channel over Ethernet (FCOE) has been developed to handle both Ethernet and Fibre Channel traffic in a storage area network (SAN). This functionality would allow Fibre Channel to leverage high speed, for example, 10 Gigabit Ethernet networks while preserving the Fibre Channel protocol. In one aspect, ISA 114A can be configured to operate as a FCOE adapter. Those of ordinary skill in the art will appreciate, however, that the present aspects are not limited to any particular protocol.

iSCSI is an IP-based storage networking standard for linking data storage facilities. By carrying SCSI commands over IP networks, iSCSI is used to facilitate data transfers over intranets and to manage storage over long distances. iSCSI can be used to transmit data over local area networks (LANs), wide area networks (WANs), or the Internet and can enable location-independent data storage and retrieval. The protocol allows clients to send SCSI commands (referred to as command or (control) data blocks (CDBs) to SCSI storage devices (may be referred to as targets) on remote servers. iSCSI is a SAN-based protocol, allowing organizations to consolidate storage into data center storage arrays while providing hosts (such as database and web servers) with the illusion of locally attached disks. Unlike traditional Fibre Channel, which uses special-purpose cabling, iSCSI can be run over long distances using existing network infrastructure. In one aspect, ISA 114A may operate as an initiator as well as a target for responding to input/output (referred to as I/O or "IO") requests for reading and writing information at storage devices.

Storage space at a storage device (local or SAN-based) is typically presented to application 105A as a logical entity referred to as a logical unit number (LUN). Each LUN is uniquely identified by an identifier (LUN ID) and is associated with physical storage space. A LUN has a size associated with it that may indicate the amount of storage space that is made available to a computing system and a drive letter that may be used to access the LUN.

A LUN is typically divided into logical block addresses (LBAs) that are used by application 105A to read and write data to storage locations. The LBAs are mapped with actual physical storage to read and write data. A LUN used by an application may be referred to as a data LUN. A LUN that is accessible via a SAN connection may be referred to as a SAN LUN. A LUN at a local storage device managed by ISA 114A may be referred to as a "cache" LUN. A cache LUN may be used to cache data stored at a SAN LUN or another data LUN. The cache LUN is managed by ISA 114A and may not be visible to application 105A.

Referring back to FIG. 1A, computing system 102A uses an adapter interface 110 to communicate with ISA 114A via a link 112. In one aspect, link 112 may be a PCI-Express link or any other interconnect type. The adaptive aspects disclosed herein are not limited to any particular link type.

ISA 114A may communicate and interface with a mass storage system 120 via a SAN 116 that may include one or more switches (may be referred to as fabric switches). The mass storage system 120 may include a plurality of storage devices 124A-124N. Storage space at storage devices 124A-124N may be presented as SAN LUNs to application 105A via SAN 116. Controller 122 of mass storage system 120 may be used to manage storage devices 124A-124N. In one aspect, controller 122 may include a processor, an ISA 114A and other similar components.

System 100 may also include a management console 118, used according to one aspect. Management console 118 may be a computer system similar to computing system 102A, described above in detail. Management console 118 executes a management application 117 that may be used to configure storage space as logical structures (for example, as LUNs) that are presented to computing systems 102A-102N for storing information or as cache LUNs at local storage for caching information stored at SAN LUNs. Permissions associated with a LUN may also be configured using management application 117. The permissions indicate which entities may be allowed to access a LUN to read and/or write information. Management application 117 may store LUN attributes and permissions in a configuration data structure 117A at a storage location.

Management application 117 may also be used to configure a cluster having a plurality of ISAs. Details regarding how a cluster is created are provided below.

In one aspect, ISA 114A is provided that can provide transparent data caching at SSDs while efficiently synchronizing the SSD data with SAN-based storage devices. The ISA enables management of data stored at the SSDs. The ISA also enables the SSDs to be shared as SAN storage allowing other servers 102B-102N to access data residing at SSDs in server 102A. ISA 114A may configure a LUN from the local storage 108 and present the LUN to servers 102A-102N, allowing the local storage 108 to be shared by other servers 102B-102N.

In another aspect, ISA 114A provides traditional SAN connectivity to computing systems 102A and to the SSDs at each computing system. The SSDs may be managed as a storage pool that may be configured to operate as a cache pool to cache read/write data for SAN LUNs presented to the computing systems. SAN LUNs when configured may be tagged with an attribute that allows caching at the local SSDs for read and/or write caching.

Figure 1B:
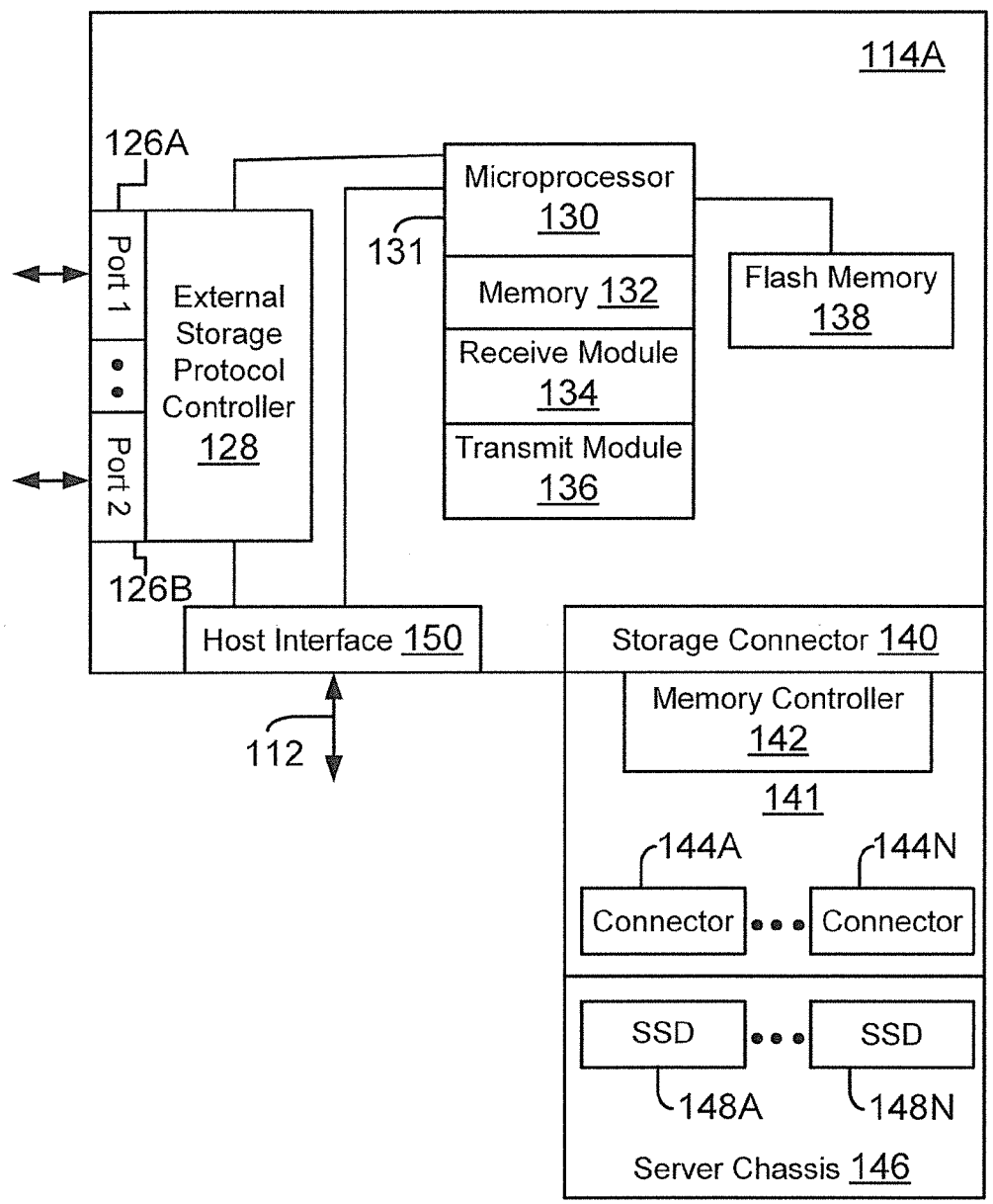
FIG. 1B shows an example of functional block diagram of an intelligent storage adapter (ISA)

FIG. 1B shows an example of ISA 114A that includes a storage protocol controller 128 (shown as "external storage protocol controller") with ports 126A and 126B. The storage protocol controller may be a Fibre Channel controller (or application specific integrated circuit (ASIC)). Ports 126A/126B include logic and circuitry for sending and receiving Fibre Channel frames. Fibre Channel is simply shown as an example and the various aspects disclosed herein are not limited to any particular storage/network protocol. Thus ports 126A-126B are not limited to just Fibre Channel ports. Furthermore, although only two ports 126A and 126B are shown as an example, the adaptive aspects disclosed herein are not limited to any particular number of ports.

Storage protocol controller 128 may operate as a host bus adapter for managing I/O requests for SAN-based storage. Storage protocol controller 128 is configured to process I/O requests for reading data from SAN-based storage (124A-124N) and writing data to SAN-based storage. Thus storage protocol controller 128 is used to take advantage of existing SAN infrastructure, while providing access to SSDs for computing systems 102A-102N.

In one aspect, storage protocol controller 128 includes a processor (not shown) for executing the Fibre Channel stack having layers FC0-FC4. FC0 is defined by the Fibre Channel specification as the physical layer, which includes cables (fiber optics, twisted-pair), connectors, and others. The FC1 layer is defined as the data link layer. This layer implements the 8B/10B encoding and decoding of signals. The FC2 layer is defined as the network layer. This layer defines the main Fibre Channel framing, addressing, and control protocols. The FC3 layer is an auxiliary layer that provides common services like encryption or RAID related. The FC4 layer is the protocol mapping layer where other protocols, such as SCSI are encapsulated into an information unit for delivery to FC2 and transmission across a Fibre Channel network. This layer provides flexibility to Fibre Channel as a networking technology compatible with other technologies.

ISA 114A also includes a host interface 150 that interfaces with processor 104 via link 112. The structure of host interface 150 depends on the type of connection/interconnect used to communicate with processor 104. For example, if a PCI-Express link is used to communicate with processor 104, then host interface 150 includes logic and circuitry for receiving and sending PCI-Express packets/information.

ISA 114A includes a system-on-chip (SOC) 131 that includes a processor 130 having access to an adapter memory (may also be referred to as local memory) 132. Processor 130 may be one or more programmable general-purpose or special-purpose microprocessors, digital signal processors (DSPs), programmable controllers, application specific integrated circuits (ASICs), reduced instruction set computer (RISC), programmable logic devices (PLDs), or the like, or a combination of such hardware devices. Memory 132 may be used to store firmware instructions and various data structures for ISA 114A for controlling overall ISA 114A operations. Memory 132 may also store instructions for implementing the various aspects described herein.

SOC 131 may also include a receive module 134 and a transmit module 136. The receive module 134 may be used to store packets that are received via ports 126A/126B, while transmit module 136 may be used to store information that is transmitted via ports 126A/126B or to local SSDs that are described below. Receive module 134 and/or transmit module 136 may be separate modules and may include more than one component for processing received information or information that is transmitted.

ISA 114A may also include a non-volatile memory 138 (shown as flash memory) for storing parameters/instructions that may be used by micro-processor 130 for executing the instructions described below in detail. ISA 114A also includes a storage connector 140 that interfaces with another card 141 (may also be referred to as a daughter card 141), according to one aspect. In one aspect, the storage connector may be a PCI-Express connector, PCI connector, or any other connector type based on the interconnect used by SOC 131 to interface with the SSDs. The daughter card 141 includes a memory controller 142 that interfaces with a plurality of connectors 144A-144N. The plurality of connectors 144A-144N are used to plug in SSDs 148A-148N (similar to storage 108). In this aspect, SSDs 148A-148N are included within a server chassis 146. In one aspect, connectors 144A-144N may be SATA connectors for receiving SSDs 148A-148N. In another aspect, connectors 144A-144N may be SAS connectors, for example.

ISA 114A has SAN connectivity because of ports 126A-126B, similar to a host bus adapter, as mentioned above. The storage protocol controller 128 allows SAN storage-based processing. Unlike conventional HBAs, ISA 114A also includes a storage connector 140 that provides local storage solutions via SSDs 148A-148N.

Another aspect of ISA 114A is configured such that a daughter card has the SSDs 148A-148N on the card itself, rather than on the server chassis 146. Another aspect of ISA 114A is configured such that the memory controller 142 is on the same card as the other components of ISA 114A. The SSDs 148A-148N are also on the same card connected via one or more storage connectors.

Figure 1C:
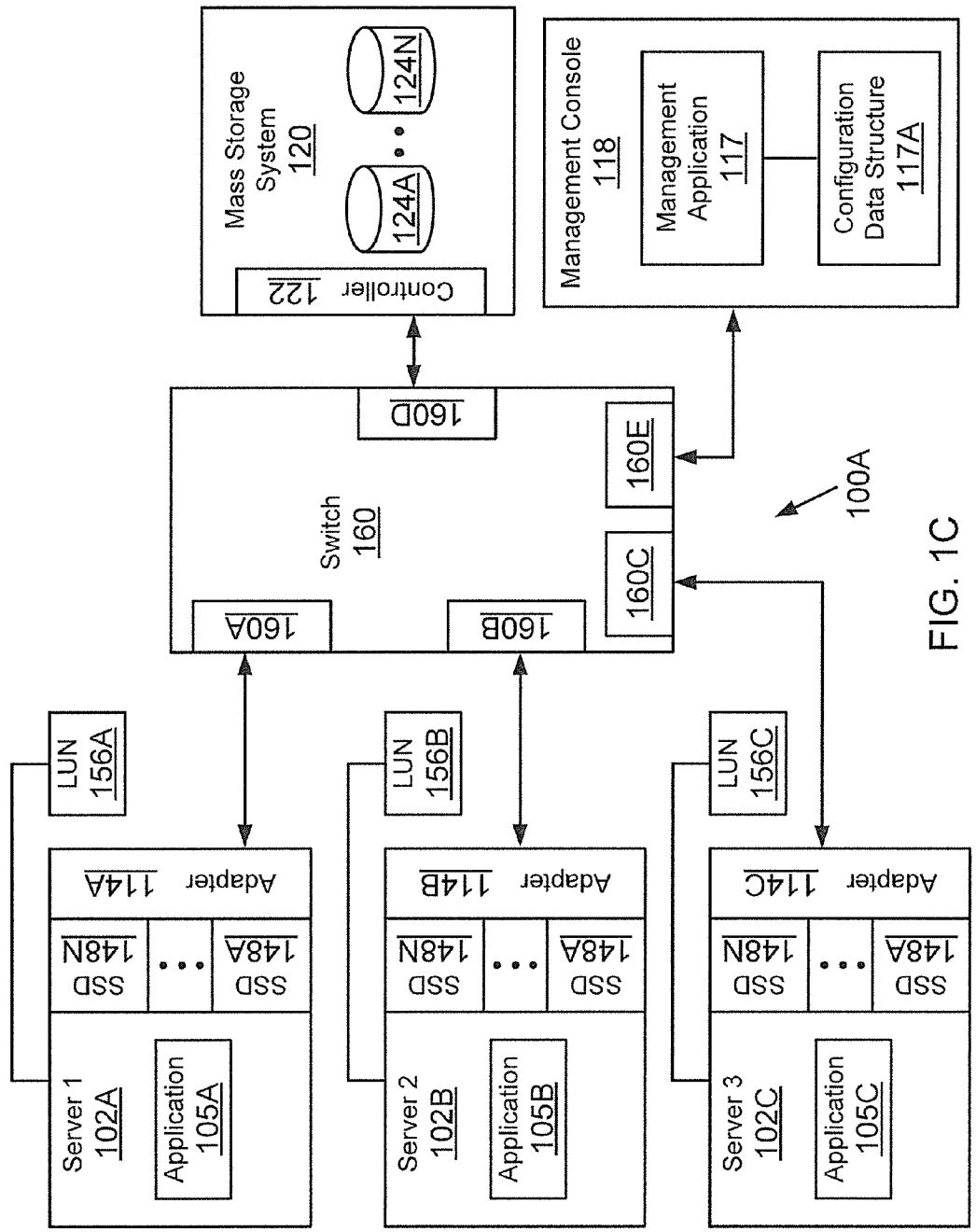
FIG. 1C shows an example of functional block diagram of a configuration for using the ISAs, according to one aspect.

FIG. 1C shows a system 100A where each ISA 114A-114C in servers 102A-102C is coupled to a fabric switch 160, according to one aspect. Fabric switch 160 that is a part of SAN 116 (shown in FIG. 1A) includes a plurality of ports 160A-160E. Ports 160A-160C are coupled to ISA 114A-114C ports, respectively, while port 160D is coupled to controller 122 of the mass storage system 120. Management console 118 may be coupled to port 160E for configuring various components of system 100A.

Management console 118 may be used to configure LUNs 156A-156C that are presented to application 105A executed by server 102A, application 105B executed by server 102B, and application 105C executed by server 102C for storing information. The LUNs may be based on storage located at SAN-based storage 120 or at a local SSD 148A-148N. In one aspect, one or more SAN LUNs are associated with an independent data LUN. The LUNs 156A-156C may also be configured to operate as local LUNs. In this configuration, a LUN may be used as a "boot" LUN. The LUN may be used by the host computing system to which it is presented. One or more ISAs may present the boot LUN to any of the servers that are served by a cluster of ISAs.

The LUNs 156A-156C may also be accessible by one or more servers via SAN 116. In this example, a DAS (direct attached storage)-based SSD becomes accessible as SAN storage, while the DAS-based storage is still managed by an application 105A (for example, a database application).

In one aspect, ISAs 114A-114C operate within a cluster. The cluster is configured using management application 117. The cluster is identified by a unique identifier. Within the cluster, a specific ISA may operate as a LUN owner or a "cache owner." The cache owner adapter interfaces with the SAN LUN for executing read and write operations. As an example, adapter 114A may be the cache owner for LUN 156A that is presented to application 105A. In this configuration, ISA 114B becomes the client ISA or the client adapter.

A caching system can operate in different modes, including "write-through" caching and "write-back" caching. "Write-through" caching means that data may be placed in cache for ease of retrieval, but at the same or nearly the same time, the data is also written to its primary storage location (often SAN storage, as discussed herein). "Write-back" caching means that data may be written to cache, but that the system will wait to write the data to its primary storage location—such as when network resources are more readily available. Although operating "write-back" caching can be more efficient, there is also risk of data loss if the cache is lost before the primary storage is updated.

Figure 1D:
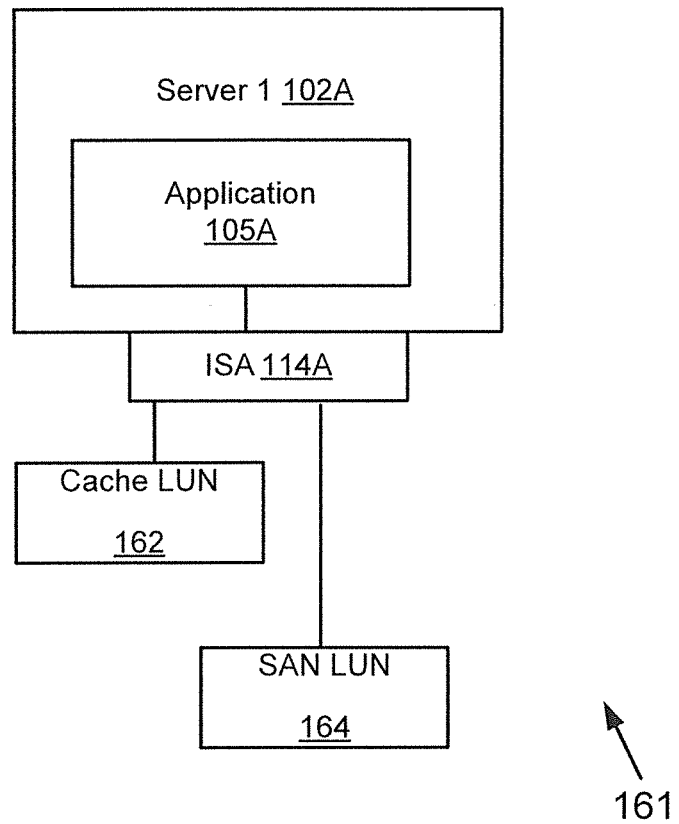
FIG. 1D shows an example of a software architecture, used according to one aspect.

FIG. 1D shows an example of an architecture 161, according to one aspect. In this aspect as shown and described, ISA 114A operates as a cache owner for Cache LUN 162. In the illustrated configuration, an application 105A may be presented with a LUN ID for storage at SAN LUN 164. However, ISA 114A may intercept I/O requests from application 105A to the SAN LUN 164 and cache some or all of the data directed to SAN LUN 164 in cache LUN 162, typically stored in a local SSD, for example, SSD 148A (see FIG. 1B). When application 105A issues an I/O request, ISA 114A receives the command and carries out the operation at cache LUN 162. The details of this process are described below.

Figure 1E:
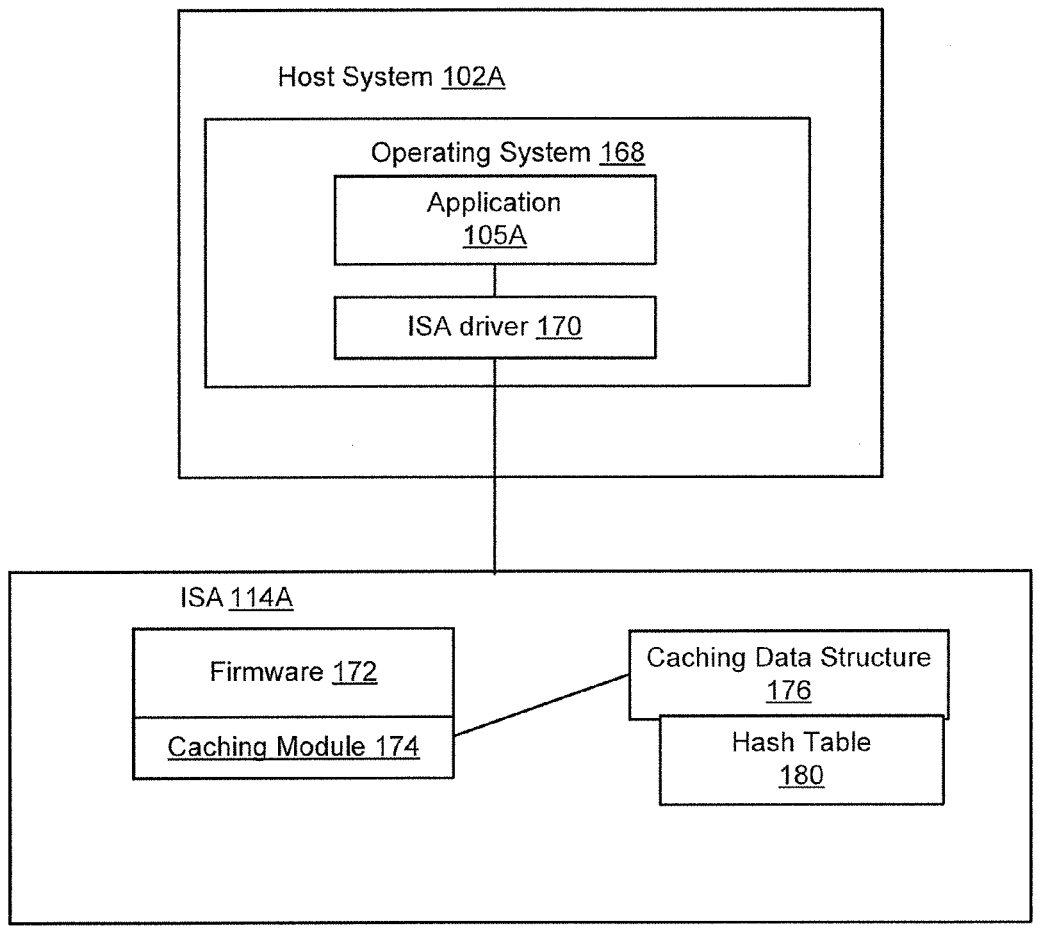
FIG. 1E illustrates an example of a software module arrangement for communications between a server and an ISA as illustrated in FIG. 1D.

Moving to FIG. 1E, aspects of software and firmware modules operating on host system 102A and ISA 114A are disclosed. Although described in terms of software and/or firmware, it is important to note that some of these modules may be implemented in any of a variety of other ways, including hardware or a combination of hardware and software, as described above and understood by those of skill in the art.

Host system 102A executes an operating system 168, such as, for example and without limitation, Linux based operating system, UNIX®, Apple® iOS, Microsoft® Windows, Android™ OS, or the like. The operating system 168 manages various applications, such as application 105A described above. Additionally, the operating system 168 may interface with an ISA driver 170, which enables communication between the host system 102A and the ISA 114A.

ISA 114A executes firmware 172 for controlling overall ISA 114A operations. Firmware 172 may include a caching module 174 for handling caching operations (for example, using the cache LUN 162 (FIG. 1D)), which may be physically located at local memory, such as 132 (FIG. 1B). In an aspect, caching module 174 includes instructions for creating and handling a caching data structure 176 which also includes a caching hash data structure 180 (may also be referred to as a hash table 180). Aspects of these data structures and the caching operations are described in more detail with reference to FIG. 1F.

Figure 1F:
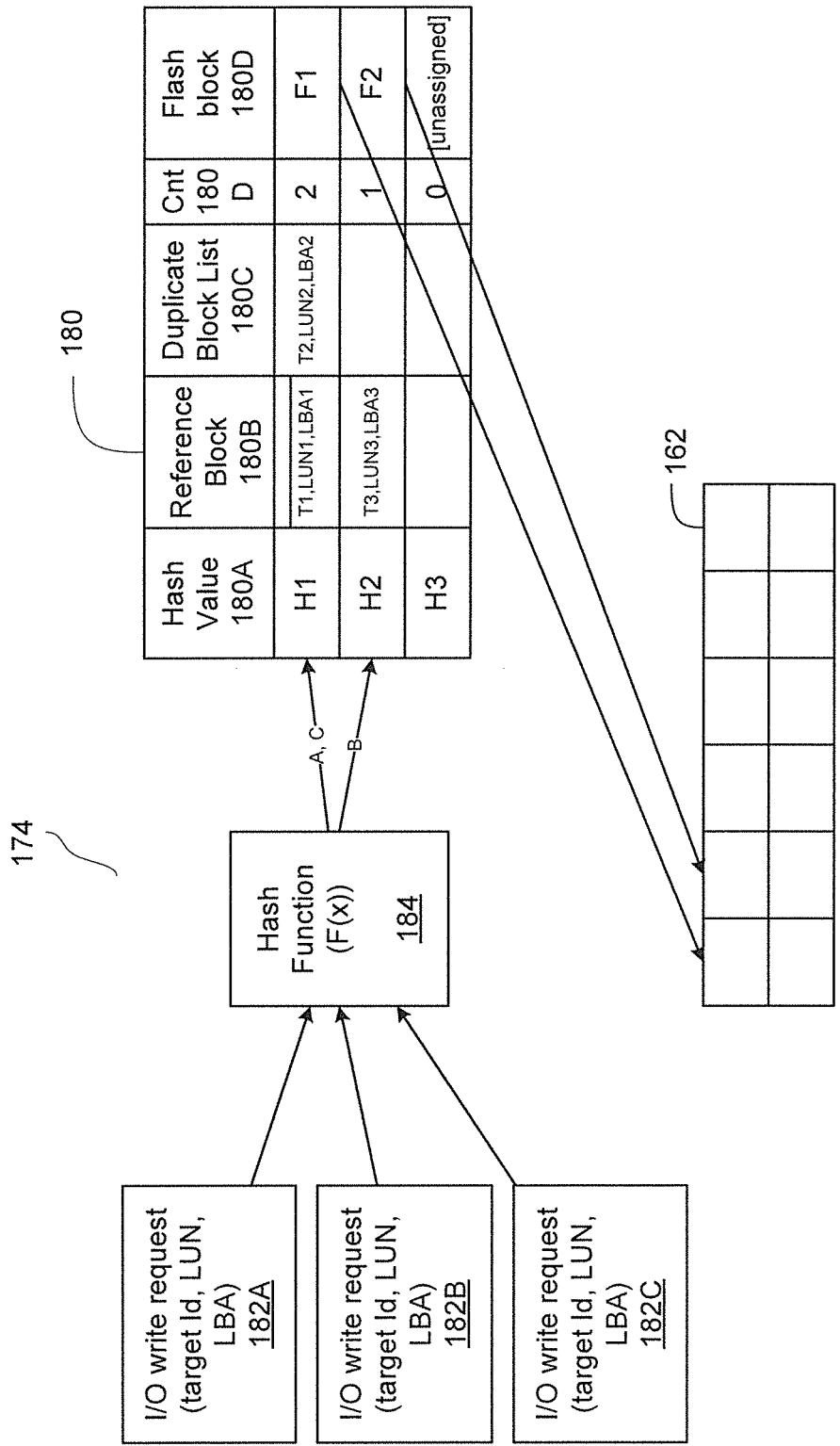
FIG. 1F illustrates an example of a caching system according to one aspect of the present disclosure.

FIG. 1F illustrates the general operation of caching module 174, which accepts I/O requests 182A, 182B, 182C . . . for processing. The I/O request is to write data at a storage location on storage media. Each request includes a target identifier (ID) identifying the storage for storing data, a LUN ID and LBA address for storing the data.

In one aspect, the data from the I/O requests is used as input into a processor executable, hash function 184 to determine a hash index value (H1, H2, H3 and others). The hash value is used to index into the hash data structure (may also be referred to as table) 180 that is described in detail below.

As example, hash table 180 may store a plurality of fields under columns 180A-180D. Hash values generated by the hash function are used to index into the hash table 180 (shown under column 180A). As described above, the hash index value is based on the actual data that is cached. Each hash index value is associated with a reference block (180B) that includes information from each I/O request. The reference block in column 180B includes a target identifier (for example, T1, T2 and T3 etc.) that identifies the target where the data is to be stored, a LUN identifier (for example, LUN1, LUN2, LUN3 . . . ) that identifies the LUN where data is stored and a LBA (for example, LBA1, LBA2, LBA3 . . . ) of the target where the data is to be stored When more than one I/O request is for the same data, then a duplicate block is identified in column 180C. A reference count for each block is also maintained as shown in column 180D. For example, when two I/O requests reference the same block, then the reference count is 2, otherwise, the reference count is 1. Although duplicate I/O requests are tracked by column 180C (such as by including a reference in a duplicate block list and/or incrementing a count) they are not written to the cache LUN to improve and optimize storage operations and utilization. The hash table 180 also identifies the cache storage blocks in column 180E where information is cached for I/O requests (shown as F1 and F2).

As illustrated in FIG. 1F, I/O 182A maybe a new write request having data that was not cached before. The hashing function 184 generates a hash value H1 using the data associated with the I/O request. The data associated with I/O 182A is cached at flash block F1. I/O 182B is for writing data that is different from request 182A. Thus the hash value H2, associated with I/O request 182B is different from H1. Since H2 is different from H1, cached data is stored at cache block F2. The entry for H2 is independent of the entry for H1 and is shown as a second table entry. I/O request 182C is to write the same data as I/O request 182A. Thus I/O request 182C hashes to H1. In this case, the cache block reference count for H1 is increased to 2 since both I/O requests 182A/182C reference to the same cache block. The system avoids writing the duplicate data to a new cache block, and instead maintains the reference count.

Figure 2:
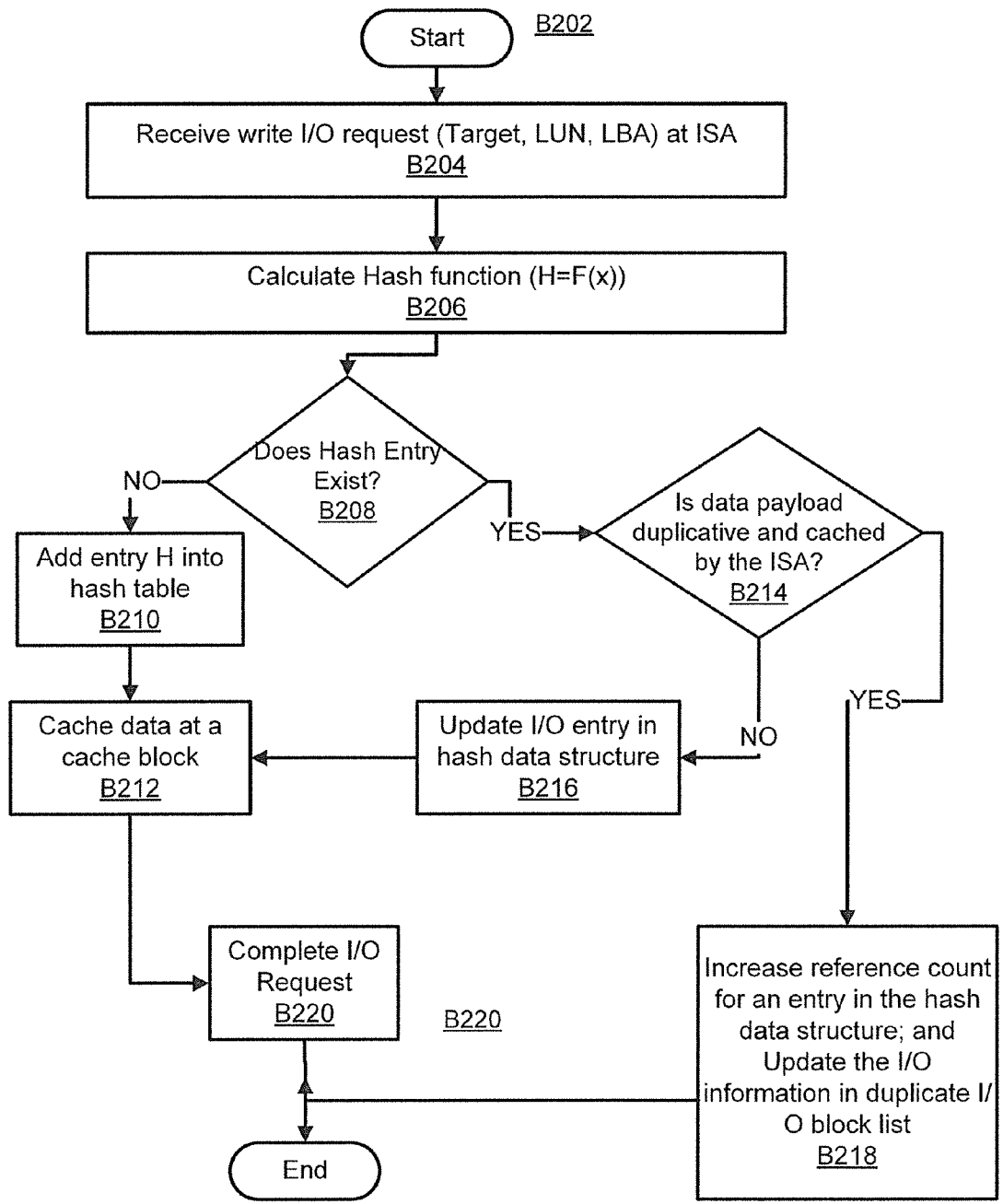
FIG. 2 shows a process flow for caching data, according to one aspect of the present disclosure.

FIG. 2 shows an example of a process for using the caching module 176 and the hash table 180, according to one of aspect of the present disclosure. In the illustrated aspect, the process starts at block B202 where an ISA (114A in FIG. 1D) is configured and operational to cache data at a cache LUN (162) for an application (105A) in response to an I/O request.

At block B204, the ISA receives a write I/O request from an application. The I/O request may be for a same or different LUN, LBA or storage media including different storage arrays or disk attached storage (DAS). The I/O request includes information identifying a target, a LUN identifier and a LBA range associated with the data that is to be written (see 182A, FIG. 1F). Using caching module (174 in FIG. 1E), the ISA calculates a hash function at block B206. In an aspect, the hash function uses the data in the I/O request that is to be written to output a hash index value.

At block B208, the ISA determines whether a hash entry corresponding to the entry determined in block. B206 already exists in the hash table (180). If there is no entry, then at block B210, the ISA (utilizing caching module 174) updates the caching data structure (176) to add an entry to the hash table (180). In block B212, the data or a portion thereof is written using the cache LUN (162). As explained above, the data may be written to a SSD managed by ISA 114A. The block where the data is written is identified in the hash table 180 under column 180E.

If there is an entry in the hash table (180) corresponding to the hash value, then at block B214, the ISA determines if the I/O request involves writing duplicate data. In block B216, if the I/O request does not involve writing duplicative data, the hash table (180) is updated with a new entry. Thereafter, in block B212, the data associated with the I/O request is cached using the cache LUN (162).

If the data is determined to be a duplicate in block B214, then in block B218, the hash table 180 is updated. The reference count associated with the existing entry is increased, which indicates that the same block stores the data for at least the two separate I/O requests. In addition, in an aspect, the information in the duplicate block list of hash table 180 is updated. Following either path (block B212 or B218), the I/O request is completed at block B220.

The method described in FIG. 2 is illustrative only, and it should be noted that the blocks shown may be combined, split apart, and/or reordered in various aspects, while still adhering to the spirit of the disclosure herein.

By maintaining the hash data structure 180 and a reference count for the cached data, the ISA avoids writing/caching duplicate data. This saves storage space at the cache and hence is more efficient.

Although the present disclosure has been described with reference to specific aspects, these aspects are illustrative only and not limiting. For example, although the description above has been described with respect to an ISA, any other device may be configured to perform the foregoing function. Thus the term adapter and device are interchangeable. Many other applications and aspects of the present disclosure will be apparent in light of this disclosure and the following claims. References throughout this specification to "one aspect" or "an aspect" means that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

What is claimed is:

1. A machine-implemented method, comprising:
configuring an adapter to cache data for an application executed by a computing device operationally coupled to the adapter, where the adapter caches data using a cache logical unit number (LUN) based on storage space at a storage device of the adapter;
receiving an input/output (I/O) request by the adapter for writing data at the storage device, the I/O request including a logical unit number (LUN) identifier, a logical block address (LBA) associated with storage space at the storage device and a data payload;

determining by the adapter, a hash value using the data payload;

using the hash value by the adapter to determine if the data payload already has been cached by the adapter;

updating a reference count at a hash data structure stored at the adapter indicating that the cached data payload is referenced by more than one I/O request, when the data payload has been cached by the adapter; and updating the hash data structure, when the data payload does not exist at the cache LUN managed by the adapter.

2. The machine-implemented method of claim 1, wherein the adapter is configured to operate as host bus adapter and an intelligent storage adapter that manages the cache LUN.

3. The machine-implemented method of claim 1, wherein the hash data structure at the adapter stores a target identifier, a LUN identifier, the LBA and an address of at least a cache block that is used by the adapter to cache the data payload.

4. The machine-implemented method of claim 1, wherein when the data payload has not been cached by the adapter, the adapter generates a new entry in the hash data structure for storing the LUN identifier, the LBA, a new reference count and an address of a cache block where the data payload is stored.

5. The machine-implemented method of claim 1, wherein the storage device is a storage area network (SAN) based storage device.

6. The machine-implemented method of claim 1, wherein the cache LUN is based on a solid state storage device managed by the adapter.

7. A system, comprising:

a memory containing machine readable medium comprising machine executable code having stored thereon instructions; and a processor module coupled to the memory, the processor module configured to execute the machine executable code to:

configure an adapter to cache data for an application executed by a computing device operationally coupled to the adapter, where the adapter caches data using a cache logical unit number (LUN) based on storage space at a storage device of the adapter;

receive an input/output (I/O) request by the adapter for writing data at the storage device, the I/O request including a logical unit number (LUN) identifier, a logical block address (LBA) associated with storage space at the storage device and a data payload;

determine by the adapter, a hash value using the data payload;

use the hash value by the adapter to determine if the data payload already has been cached by the adapter;

update a reference count at a hash data structure stored at the adapter indicating that the cached data payload is referenced by more than one I/O request, when the data payload has been cached by the adapter; and update the hash data structure, when the data payload does not exist at the cache LUN managed by the adapter.

8. The system of claim 7, wherein the adapter is configured to operate as host bus adapter and an intelligent storage adapter that manages the cache LUN.

9. The system of claim 7, wherein the hash data structure at the adapter stores a target identifier, the LUN identifier, the LBA and an address of at least a cache block that is used by the adapter to cache the data payload.

10. The system of claim 7, wherein when the data payload has not been cached by the adapter, the adapter generates a new entry in the hash data structure for storing the LUN identifier, the LBA, a new reference count and an address of a cache block where the data payload is stored.

11. The system of claim 7, wherein the storage device is a storage area network (SAN) based storage device.

12. The system of claim 7, wherein the cache LUN is based on a solid state storage device managed by the adapter.

13. A non-transitory, machine readable storage medium having stored thereon instructions for performing a method, comprising machine executable code which when executed by at least one machine, causes the machine to:

configure an adapter to cache data for an application executed by a computing device operationally coupled to the adapter, where the adapter caches data using a cache logical unit number (LUN) based on storage space at a storage device of the adapter;

receive an input/output (I/O) request by the adapter for writing data at the storage device, the I/O request including a logical unit number (LUN) identifier, a logical block address (LBA) associated with storage space at the storage device and a data payload;

determine by the adapter, a hash value using the data payload;

use the hash value by the adapter to determine if the data payload already has been cached by the adapter;

update a reference count at a hash data structure stored at the adapter indicating that the cached data payload is referenced by more than one I/O request, when the data payload has been cached by the adapter; and update the hash data structure, when the data payload does not exist at the cache LUN managed by the adapter.

14. The storage medium of claim 13, wherein the adapter is configured to operate as host bus adapter and an intelligent storage adapter that manages the cache LUN.

15. The storage medium of claim 13, wherein the hash data structure at the adapter stores a target identifier, the LUN identifier, the LBA and an address of at least a cache block that is used by the adapter to cache the data payload.

16. The storage medium of claim 13, wherein when the data payload has not been cached by the adapter, the adapter generates a new entry in the hash data structure for storing the LUN identifier, the LBA, a new reference count and an address of a cache block where the data payload is stored.

17. The storage medium of claim 13, wherein the storage device is a storage area network (SAN) based storage device.

18. The storage medium of claim 13, wherein the cache LUN is based on a solid state storage device managed by the adapter.

* * * * *